E. S. FOLJAMBE.
PEDAL LOCKING MECHANISM.
APPLICATION FILED NOV. 18, 1910.

1,156,990.

Patented Oct. 19, 1915.

UNITED STATES PATENT OFFICE.

EUGENE S. FOLJAMBE, OF PHILADELPHIA, PENNSYLVANIA.

PEDAL-LOCKING MECHANISM.

1,156,990.    Specification of Letters Patent.    Patented Oct. 19, 1915.

Application filed November 18, 1910. Serial No. 593,042.

*To all whom it may concern:*

Be it known that I, EUGENE S. FOLJAMBE, a citizen of the United States, residing at Philadelphia, in the State of Pennsylvania, have invented certain new and useful Improvements in Pedal-Locking Mechanism, of which the following is a specification.

The invention relates broadly to a special arrangement of operating pedals or devices, and relates particularly to means for locking the pedals of automobiles and similar vehicles.

The primary object of the invention is to provide a simple yet effective means to lock the pedals when the vehicle is not in use, so that it will be impossible to throw the clutch, brake or other part of the operating mechanism into operative relation and thus prevent the use of the vehicle until such part is released.

A further object of the invention is to provide a combination and arrangement of parts whereby accidental slipping of the foot when the pedal is being operated will be prevented, and which will also provide a guide for the foot in case of an emergency or other occasion when it is desired to operate the pedal very quickly.

Another object of the invention is to provide an arrangement and construction of parts which will permit the pedal to be made flush with or slightly below the floor of the vehicle, thus preventing injury to the levers or parts of the pedal which usually extend above the floor and also improve the appearance of the vehicle. Instead of iron, which is cold to the feet, the surface of the pedals can be made of the same material as the floor board, such, for instance as pyramid aluminum.

Figure 1:
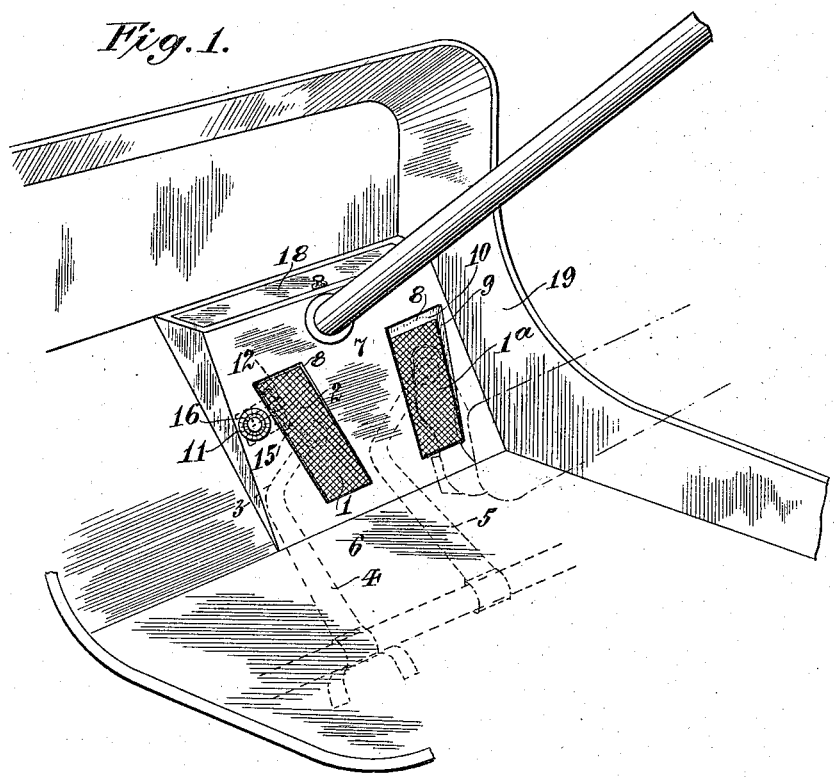
Figure 2:
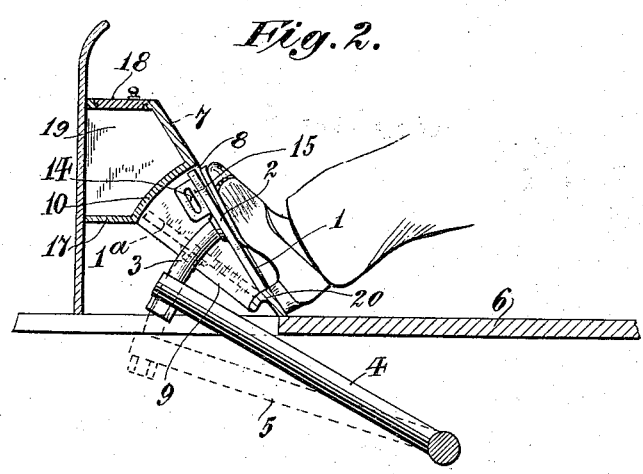

In the accompanying drawings: Figure 1 is a view in perspective of a front portion of a vehicle embodying my improved locking pedal. Fig. 2 is a side elevation partly in section of the same.

As illustrated in the accompanying drawings, the pedal 1 preferably comprises a foot plate 2 which is connected by a shank 3 to the arm 4, which may be operatively connected in any suitable manner with the movable part of the driving mechanism of the vehicle, such as the clutch (not shown). A pedal 1ᵃ may also be provided, which is connected to any other movable part of the driving mechanism (not shown) by the arm 5. The floor of the vehicle 6 may be made of boards cast of aluminum or other suitable metal or material. Preferably the floor comprises a raised portion or platform 7 adjacent to the pedals. The floor or platform is provided with openings 8 to receive the pedals, and the front and sides of said openings, and if desired the rear also, are provided with a guard 9 depending from the floor, and preferably formed integral therewith. The end guards 10 are curved to the same arc described by the pedal in its movement.

A lock of any suitable construction, such as a combination lock 11 is mounted in the floor or the platform and comprises a bolt 12 which is adapted to engage in a socket 14 provided preferably in the plate or lug 15, which is secured to or formed integral with the pedal and preferably with the pedal plate. Said bolt may be operated directly by the knob 16 of the combination lock, or in any other suitable manner. The plate 15 is preferably secured at or near the edge of the pedal so that it will be arranged close to the side guard for the pedal and will thus shield the screws or other holding devices for the lock when the pedal is in its locked position. If desired the raised portion of the floor may be provided with a suitable partition 17 and with a door or cover 18 thus forming a compartment to receive tools or other articles, the said compartment having one of its walls formed by the end guard 19.

In operation the pedal rests very slightly below the plane of the floor, as shown in full lines in Fig. 2. The ball of the foot of the operator thus rests upon the pedal plate, while the heel is supported by the rigid but inclined portion 20 of the floor. Consequently the toe of the operator will be engaged by the guard as soon as the downward movement of the pedal begins to the position shown in the dotted lines in Fig. 2, thus preventing the foot from slipping. By means of this construction the accidental slipping of the foot from the pedal when it is operated with great speed or under the excitement of a sudden emergency is absolutely prevented. The foot of the operator can rest on the pedals all of the time and yet be in a normal and comfortable position. The floor of the car is free from projecting levers and pedals, thus improving the appearance of the car and protecting the levers or pedals from injury and also preventing accidental engagement with articles which may be placed on the floor which would prevent the prompt and speedy operation of the levers or pedals in case of an emergency. When the pedal is in its locked position, so as to hold the parts of the transmission gear out of engagement, such, for instance, as the parts of the clutch, it is impossible to start or operate the vehicle under its own power, yet the running gear is free and it would be possible to move the vehicle by other power if desired. It is also possible while the pedal is locked to operate the engine for any purpose desired, such as making adjustments and repairs.

Although I have shown one form of mechanism embodying my invention, it will be obvious that various changes within the skill of the mechanic may be made in the details of construction thereof without departing from the spirit of the invention, provided the means set forth in the following claims be employed.

I claim as my invention:—

1. In a device of the class described, the combination with a platform having an opening therein, of a mechanism actuating shaft mounted beneath said platform for rotary movement about a fixed axis, a lever arm operatively connected to said shaft and extending toward said opening, a foot plate fitting within said opening and normally disposed in position substantially flush with the top of the platform so as to form a continuity of floor surface therewith, a connection with said foot plate and said lever whereby stepping on said plate will rotate said shaft, said platform being provided with a toe guard curved to the arc of movement of the plate, outlining the forward portion of the opening and depending from the top of said platform whereby the toe of the operator is held from slipping off the plate in all positions of the plate when depressed from its normal position.

2. In a device of the class described, the combination with a platform having an opening therein, of a mechanism actuating shaft mounted beneath said platform for rotary movement about a fixed axis, a lever arm operatively connected to said shaft and extending toward said opening, a foot plate fitting within said opening and normally disposed in position substantially flush with the top of the platform so as to form a continuity of floor surface therewith, a connection with said floor plate and said lever whereby stepping on said plate will rotate said shaft, said platform being provided with a toe guard curved to the arc of movement of the plate, outlining the forward portion of the opening and depending from the top of said platform whereby the toe of the operator is held from slipping off the plate as soon as the plate is depressed, and a locking means controlled from the top of the platform for maintaining said plate in one of its positions.

3. In a device of the class described, the combination of a floor, a platform inclined at an angle to said floor and co-acting therewith to form a heel rest for the operator's foot when actuating the device, said platform having an opening therein adjacent the jointure of the floor and platform, a foot plate fitting within said opening and normally disposed in position substantially flush with the top of the platform so as to form a continuity of surface therewith, a lock carried by said platform below the top surface thereof and having means for engaging said pedal when in depressed position to hold the same, a guard plate outlining a portion of said opening and depending from said platform in position to shield the lock, and mechanism operatively connected to said pedal and retained in position by said lock.

This specification signed and witnessed this 10th day of November, A. D., 1910.

EUGENE S. FOLJAMBE.

Signed in the presence of—
REGIN. B. CHASE,
LEONARDO CLARK.

Copies of this patent may be obtained for five cents each, by addressing the "Commissioner of Patents, Washington, D. C."